US012562936B2

(12) United States Patent
Emigh et al.

(10) Patent No.: US 12,562,936 B2
(45) Date of Patent: Feb. 24, 2026

(54) AUTOMATIC SCENE CREATION USING HOME DEVICE CONTROL

(71) Applicant: Brilliant NextGen Inc., San Mateo, CA (US)

(72) Inventors: Aaron T. Emigh, Incline Village, NV (US); Steven Stanek, Fremont, CA (US); Jeremy Hiatt, San Mateo, CA (US); Ashley Chou, San Mateo, CA (US)

(73) Assignee: Brilliant NextGen Inc., San Mateo, CA (US)

( * ) Notice: Subject to any disclaimer, the term of this patent is extended or adjusted under 35 U.S.C. 154(b) by 0 days.

(21) Appl. No.: 18/376,753

(22) Filed: Oct. 4, 2023

(65) Prior Publication Data

US 2024/0113910 A1      Apr. 4, 2024

Related U.S. Application Data

(63) Continuation of application No. 17/348,536, filed on Jun. 15, 2021, now Pat. No. 11,811,550, which is a
(Continued)

(51) Int. Cl.
*G05B 99/00*           (2006.01)
*G05B 15/02*           (2006.01)
(Continued)

(52) U.S. Cl.
CPC .......... *H04L 12/2829* (2013.01); *G05B 15/02* (2013.01); *G06N 20/00* (2019.01); *H04L 12/2814* (2013.01); *H04L 12/282* (2013.01)

(58) Field of Classification Search
CPC ............................................. G05B 2219/2642
See application file for complete search history.

(56) References Cited

U.S. PATENT DOCUMENTS 9,208,676 B2      12/2015  Fadell et al.
9,614,690 B2       4/2017  Ehsani et al.
(Continued)

FOREIGN PATENT DOCUMENTS

CN          106814720 A   *   6/2017
CN          107229230 A       10/2017
(Continued)

OTHER PUBLICATIONS

Extended European Search Report dated Dec. 12, 2023, Application No. 21736185.6-1211 8 pages.
(Continued)

*Primary Examiner* — Suresh Suryawanshi
(74) *Attorney, Agent, or Firm* — Mahamedi IP Law LLP

(57)                    ABSTRACT

A distributed system of home device controllers can control a set of home devices. A home device controller of the system can determine a set of configurations for a set of home devices being repeatedly configured by a user. The controller can automatically display a selectable feature indicating a suggested scene corresponding to the set of configurations for the set of home devices. The system can receive one or more inputs to select the suggested scene, and based at least in part on the one or more inputs, associate the suggest scene with a set of triggers. In response to detecting the set of triggers, the controller can automatically transmit a set of commands that correspond to the suggested scene to the set of home devices to execute the suggested scene.

10 Claims, 6 Drawing Sheets

Related U.S. Application Data continuation of application No. 16/241,945, filed on Jan. 7, 2019, now Pat. No. 11,057,238.

(60) Provisional application No. 62/615,004, filed on Jan. 8, 2018.

(51) Int. Cl.
  *G06N 20/00*    (2019.01)
  *H04L 12/28*    (2006.01)

(56)         References Cited

U.S. PATENT DOCUMENTS

| | | | |
|---|---|---|---|
| 9,835,434 | B1 | 12/2017 | Sloo |
| 10,375,807 | B1 | 8/2019 | Reilly et al. |
| 10,375,897 | B2 | 8/2019 | Reilly |
| 10,623,246 | B1 | 4/2020 | Iyer et al. |
| 11,507,217 | B2 | 11/2022 | Emigh |
| 11,921,948 | B2 | 3/2024 | Emigh et al. |
| 2002/0016639 | A1 | 2/2002 | Smith |
| 2003/0040812 | A1 | 2/2003 | Gonzales |
| 2006/0132303 | A1 | 6/2006 | Stilp |
| 2006/0212136 | A1 | 9/2006 | Lee |
| 2008/0158172 | A1 | 7/2008 | Hotelling |
| 2008/0223706 | A1 | 9/2008 | Hagiwara |
| 2009/0158188 | A1 | 6/2009 | Bray |
| 2010/0001746 | A1 | 1/2010 | Duchene |
| 2010/0146423 | A1 | 6/2010 | Duchene |
| 2011/0063224 | A1 | 3/2011 | Vexo |
| 2011/0084936 | A1 | 4/2011 | Chang et al. |
| 2011/0137836 | A1 | 6/2011 | Kuriyama |
| 2011/0221924 | A1* | 9/2011 | Kuma ................... H04N 23/62 |
| | | | 348/222.1 |
| 2012/0175642 | A1 | 7/2012 | Du Plessis et al. |
| 2012/0259992 | A1 | 10/2012 | Koehler |
| 2012/0310415 | A1 | 12/2012 | Raestik |
| 2013/0131839 | A1 | 5/2013 | Washington |
| 2013/0157729 | A1 | 6/2013 | Tabe |
| 2013/0187887 | A1 | 7/2013 | Mizuhashi |
| 2013/0191233 | A1 | 7/2013 | Atkinson et al. |
| 2013/0198858 | A1 | 8/2013 | Atkinson et al. |
| 2013/0201151 | A1 | 8/2013 | Takashima |
| 2013/0219520 | A1 | 8/2013 | Atkinson et al. |
| 2014/0006465 | A1 | 1/2014 | Davis |
| 2014/0071588 | A1 | 3/2014 | Chen |
| 2014/0094123 | A1 | 4/2014 | Polo et al. |
| 2014/0108019 | A1 | 4/2014 | Ehsani |
| 2014/0201666 | A1 | 7/2014 | Bedikian |
| 2014/0225855 | A1 | 8/2014 | Aitchison |
| 2014/0253483 | A1 | 9/2014 | Kupersztoch |
| 2014/0257532 | A1 | 9/2014 | Kim |
| 2014/0266669 | A1 | 9/2014 | Fadell et al. |
| 2014/0292396 | A1 | 10/2014 | Bruwer |
| 2015/0005952 | A1 | 1/2015 | Sasaki |
| 2015/0077343 | A1 | 3/2015 | Shao |
| 2015/0097780 | A1 | 4/2015 | Hotelling |
| 2015/0156031 | A1 | 6/2015 | Fadell |
| 2015/0163412 | A1 | 6/2015 | Holley |
| 2015/0187209 | A1 | 7/2015 | Brandt |
| 2015/0241860 | A1 | 8/2015 | Raid |
| 2015/0256391 | A1 | 9/2015 | Hardy et al. |
| 2015/0293513 | A1 | 10/2015 | Schlette et al. |
| 2016/0012348 | A1 | 1/2016 | Johnson et al. |
| 2016/0025367 | A1 | 1/2016 | Matsuoka et al. |
| 2016/0043926 | A1 | 2/2016 | Frei |
| 2016/0117019 | A1 | 4/2016 | Takeda |
| 2016/0259308 | A1 | 9/2016 | Fadell |
| 2016/0277203 | A1 | 9/2016 | Jin |
| 2016/0277204 | A1 | 9/2016 | Kang |
| 2016/0291947 | A1 | 10/2016 | Gao |
| 2016/0372138 | A1 | 12/2016 | Shinkai |
| 2017/0005818 | A1 | 1/2017 | Gould |
| 2017/0006504 | A1 | 1/2017 | Townend |
| 2017/0017324 | A1 | 1/2017 | O'Keeffe |
| 2017/0019265 | A1 | 1/2017 | Hou |

| | | | |
|---|---|---|---|
| 2017/0026194 | A1 | 1/2017 | Vijayrao et al. |
| 2017/0131891 | A1 | 5/2017 | Novet |
| 2017/0163437 | A1 | 6/2017 | Yang et al. |
| 2017/0178466 | A1 | 6/2017 | Chiu |
| 2017/0187809 | A1 | 6/2017 | Chen et al. |
| 2017/0195130 | A1 | 7/2017 | Landow et al. |
| 2017/0201791 | A1* | 7/2017 | Fu ........................ H04L 12/2812 |
| 2017/0205958 | A1 | 7/2017 | Kurasawa |
| 2017/0220197 | A1 | 8/2017 | Matsumoto |
| 2017/0280274 | A1 | 9/2017 | Notohardjono et al. |
| 2017/0292712 | A1 | 10/2017 | Alexander |
| 2017/0336902 | A1 | 11/2017 | Smith |
| 2017/0339004 | A1 | 11/2017 | Hall |
| 2017/0357439 | A1 | 12/2017 | Lemay |
| 2017/0359190 | A1 | 12/2017 | Nadathur |
| 2018/0052451 | A1 | 2/2018 | Billi-Duran |
| 2018/0091326 | A1 | 3/2018 | McLaughlin |
| 2018/0091331 | A1 | 3/2018 | Agrawal et al. |
| 2018/0097469 | A1 | 4/2018 | Yoshida et al. |
| 2018/0160284 | A1 | 6/2018 | Lim et al. |
| 2018/0160301 | A1 | 6/2018 | Kwon et al. |
| 2018/0181248 | A1 | 6/2018 | Chang |
| 2018/0181849 | A1 | 6/2018 | Cassidy et al. |
| 2018/0191517 | A1 | 7/2018 | Emigh |
| 2018/0292962 | A1 | 10/2018 | Choi |
| 2018/0300645 | A1 | 10/2018 | Segal |
| 2018/0323996 | A1 | 11/2018 | Roman |
| 2019/0029096 | A1 | 1/2019 | O'Driscoll et al. |
| 2019/0035567 | A1 | 1/2019 | O'Keeffe |
| 2019/0174611 | A1 | 6/2019 | Senas |
| 2019/0215184 | A1 | 7/2019 | Emigh et al. |
| 2019/0229943 | A1 | 7/2019 | Edwards |
| 2019/0265858 | A1 | 8/2019 | Nishio |
| 2019/0280891 | A1 | 9/2019 | Pognant |
| 2019/0371145 | A1 | 12/2019 | McQueen et al. |
| 2020/0007356 | A1* | 1/2020 | Mason ................. H05B 47/155 |
| 2020/0028734 | A1 | 1/2020 | Emigh et al. |
| 2020/0097112 | A1 | 3/2020 | Seo |
| 2020/0162287 | A1 | 5/2020 | Wang |
| 2020/0210022 | A1 | 7/2020 | Kim |
| 2021/0019284 | A1 | 1/2021 | Bowman |
| 2021/0194758 | A1 | 6/2021 | Emigh |
| 2021/0208723 | A1 | 7/2021 | Emigh |
| 2021/0208724 | A1 | 7/2021 | Emigh |
| 2021/0210939 | A1 | 7/2021 | Emigh |
| 2021/0211319 | A1 | 7/2021 | See |
| 2021/0218399 | A1 | 7/2021 | Cardanha |
| 2022/0006664 | A1 | 1/2022 | Emigh |
| 2022/0224596 | A1 | 7/2022 | Emigh |
| 2023/0019612 | A1 | 1/2023 | See |
| 2023/0044270 | A1 | 2/2023 | Emigh |

FOREIGN PATENT DOCUMENTS

| | | | | |
|---|---|---|---|---|
| DE | 102017127224 | A1 | 5/2019 | |
| EP | 1624398 | A1 * | 2/2006 | ......... H04L 12/2803 |
| EP | 3073338 | A1 | 9/2016 | |
| EP | 3131235 | A1 * | 2/2017 | ............ G05B 19/04 |
| EP | 2887166 | B1 | 7/2019 | |
| JP | 6062085 | B1 | 1/2017 | |
| JP | 2017523737 | A * | 8/2017 | |
| WO | 2008111505 | A1 | 9/2008 | |
| WO | WO-2009050093 | A1 * | 4/2009 | .......... H01H 13/705 |
| WO | WO-2017/107521 | | 6/2017 | |
| WO | WO-2017/192752 | | 11/2017 | |
| WO | WO-2018/129105 | | 7/2018 | |
| WO | WO-2019/136440 | | 7/2019 | |
| WO | WO-2020/018995 | | 1/2020 | |

OTHER PUBLICATIONS

International Search Report and The Written Opinion of the International Searching Authority mailed Apr. 18, 2019, for related PCT Application No. PCT/US19/012698 filed Jan. 8, 2019, 7 pages.
International Search Report and The Written Opinion of the International Searching Authority mailed Nov. 14, 2019, for related PCT Application No. PCT/US19/42843 filed Jul. 22, 2019, 8 pages.

(56) References Cited

OTHER PUBLICATIONS

International Search Report and The Written Opinion of the International Searching Authority mailed Feb. 25, 2021, for related PCT Application No. PCT/US21/12214 filed Jan. 5, 2021, 8 pages.
Extended European Search Report dated Mar. 9, 2022, Application No. 19837970.3 11 pages.
Extended European Search Report dated Dec. 21, 2023, Application No. 21736185.6, 8 pages.

* cited by examiner

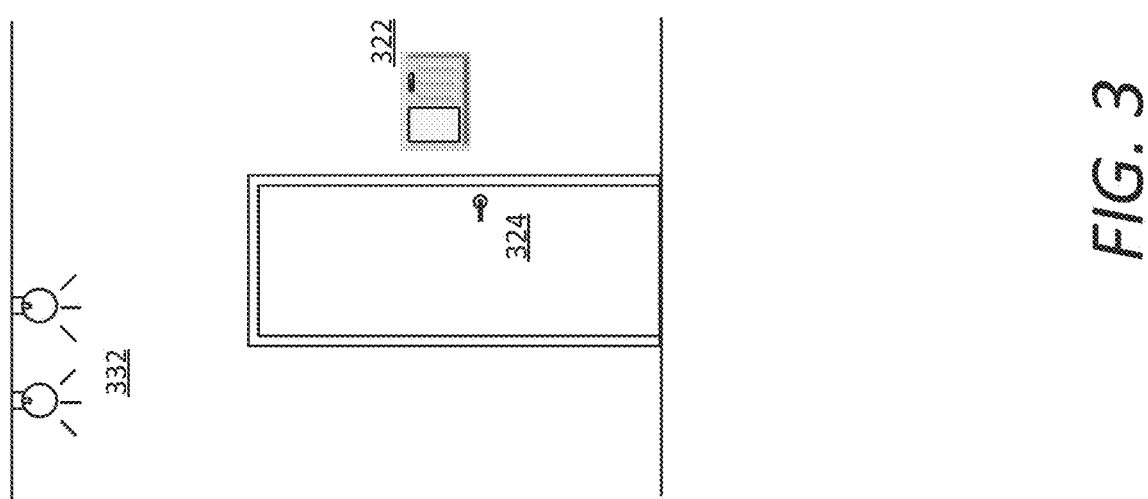
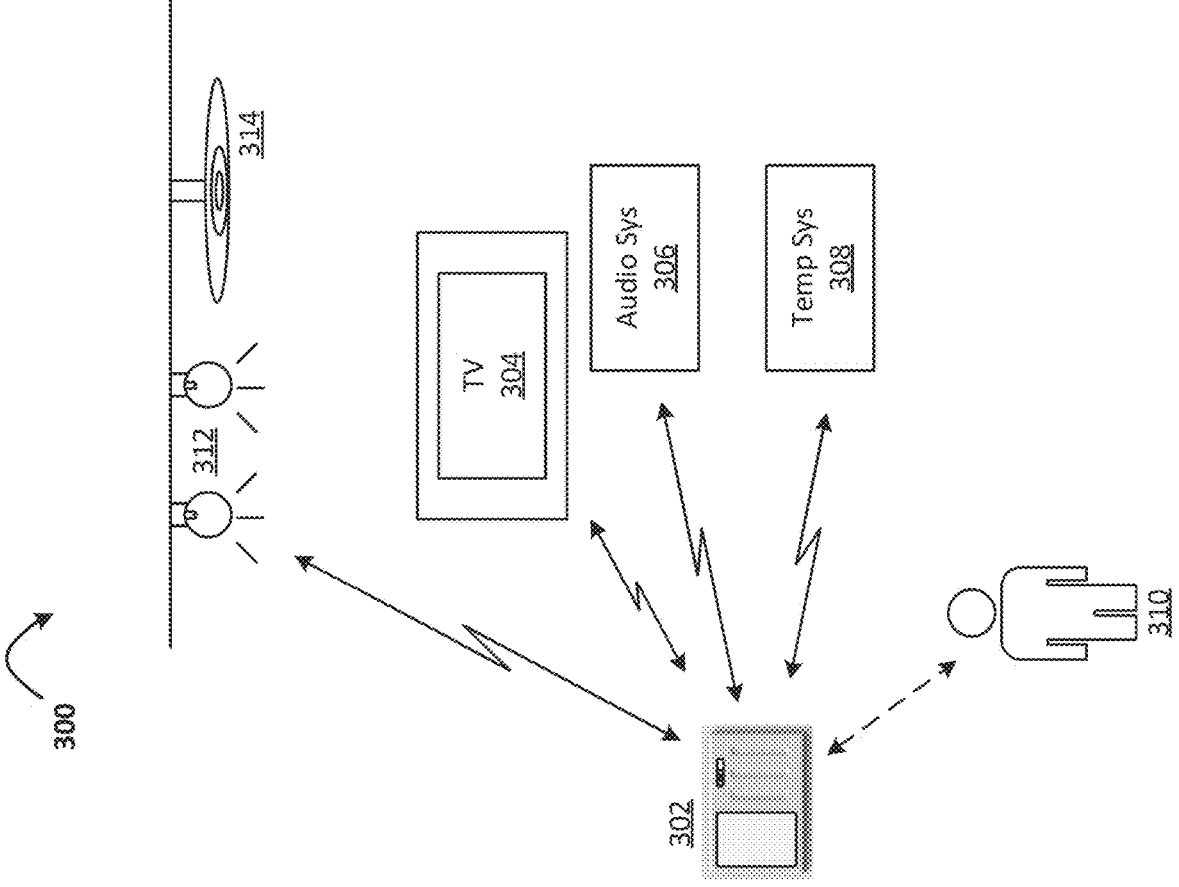
*FIG. 3*

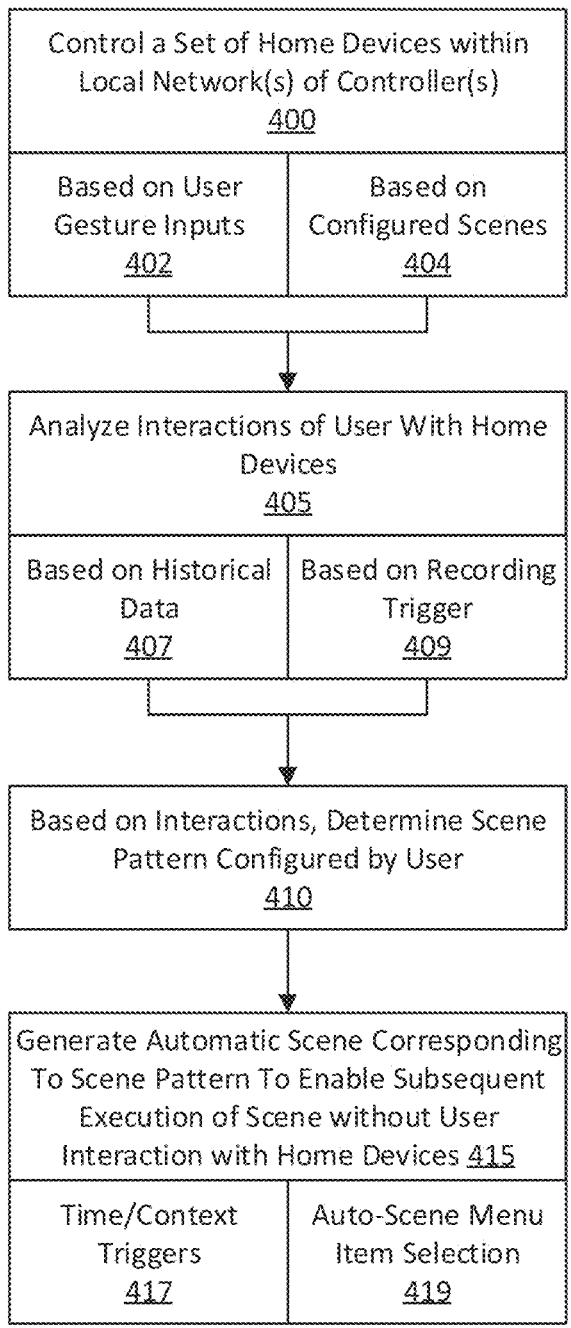

Control a Set of Home Devices within Local Network(s) of Controller(s)
400

| Based on User Gesture Inputs 402 | Based on Configured Scenes 404 |

Analyze Interactions of User With Home Devices
405

| Based on Historical Data 407 | Based on Recording Trigger 409 |

Based on Interactions, Determine Scene Pattern Configured by User
410

Generate Automatic Scene Corresponding To Scene Pattern To Enable Subsequent Execution of Scene without User Interaction with Home Devices 415

| Time/Context Triggers 417 | Auto-Scene Menu Item Selection 419 |

FIG. 4

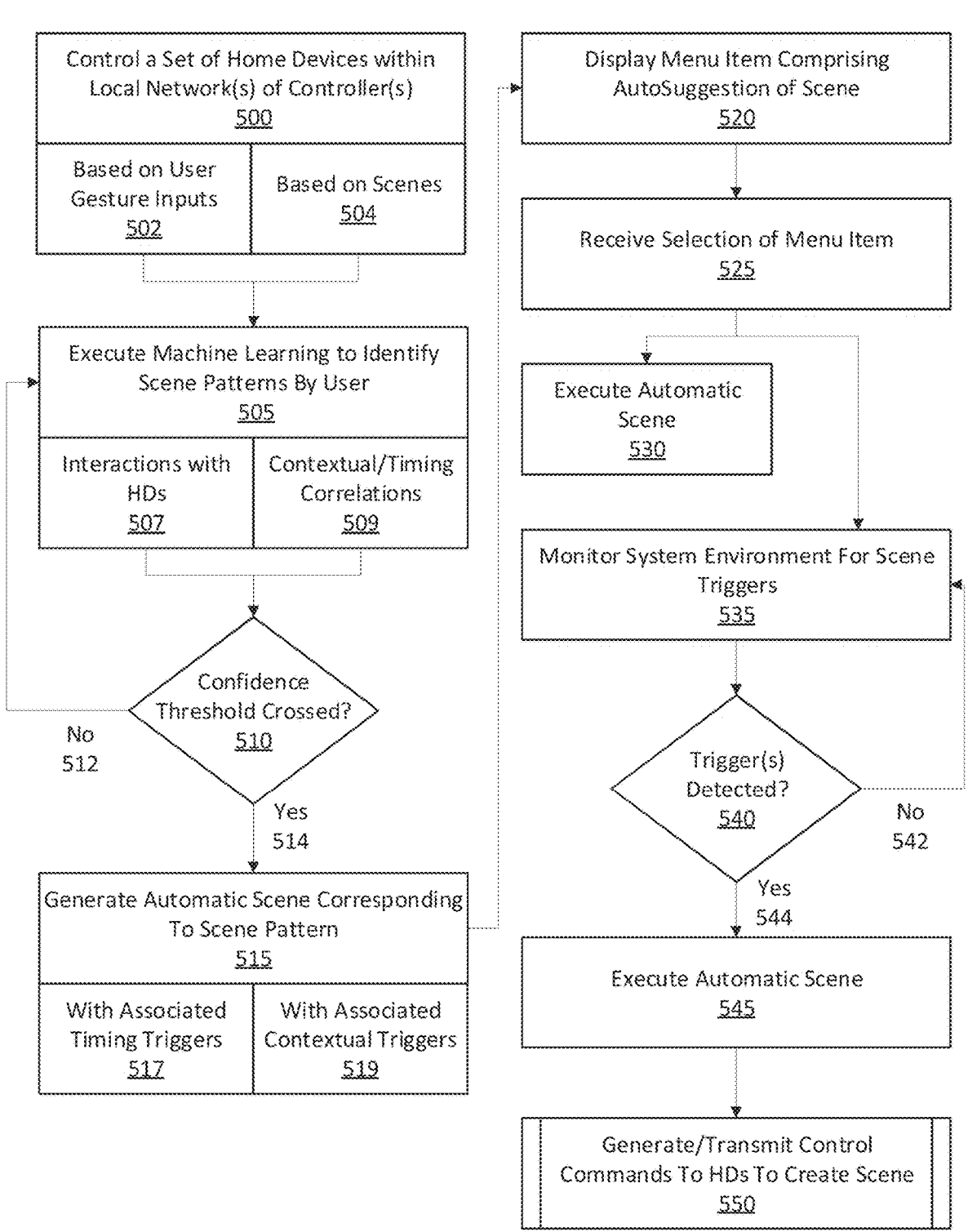

Control a Set of Home Devices within
Local Network(s) of Controller(s)
500

| Based on User Gesture Inputs 502 | Based on Scenes 504 |

Execute Machine Learning to Identify
Scene Patterns By User
505

| Interactions with HDs 507 | Contextual/Timing Correlations 509 |

Confidence
Threshold Crossed?
510

No
512

Yes
514

Generate Automatic Scene Corresponding
To Scene Pattern
515

| With Associated Timing Triggers 517 | With Associated Contextual Triggers 519 |

Display Menu Item Comprising
AutoSuggestion of Scene
520

Receive Selection of Menu Item
525

Execute Automatic
Scene
530

Monitor System Environment For Scene
Triggers
535

Trigger(s)
Detected?
540

No
542

Yes
544

Execute Automatic Scene
545

Generate/Transmit Control
Commands To HDs To Create Scene
550

FIG. 5

AUTOMATIC SCENE CREATION USING HOME DEVICE CONTROL

CROSS-REFERENCE TO RELATED APPLICATION

This application is a continuation application of U.S. patent application Ser. No. 17/348,536, filed Jun. 15, 2021, which is a continuation application of U.S. patent application Ser. No. 16/241,945, filed on Jan. 7, 2019 (now U.S. Pat. No. 11,057,238); which claims the benefit of priority to U.S. Provisional Application No. 62/615,004, filed on Jan. 8, 2018; the aforementioned applications being hereby incorporated by reference in their respective entireties.

BACKGROUND

Home control systems, such as lighting control systems used for lighting fixtures, include binary analog switches and analog dimmer switches that enable users to control one or more lights wired to an electrical box upon which such switches are connected. Furthermore, when a person wishes to activate or interact with home systems, the person typically must interact with an actual device of the system or a dedicated or universal remote control and manually create an environment comprising activated or dimmed lights, audio system output, visual system output (e.g., a television or digital picture frame output), temperature, and the like.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 3 illustrates execution of an automatic scene by one or more home device controllers, according to various aspects described herein;

FIGS. 4 and 5 are flow charts describing example methods of determining and executing automatic scenes via home device control, according to various implementations.

DETAILED DESCRIPTION

Figure 1:
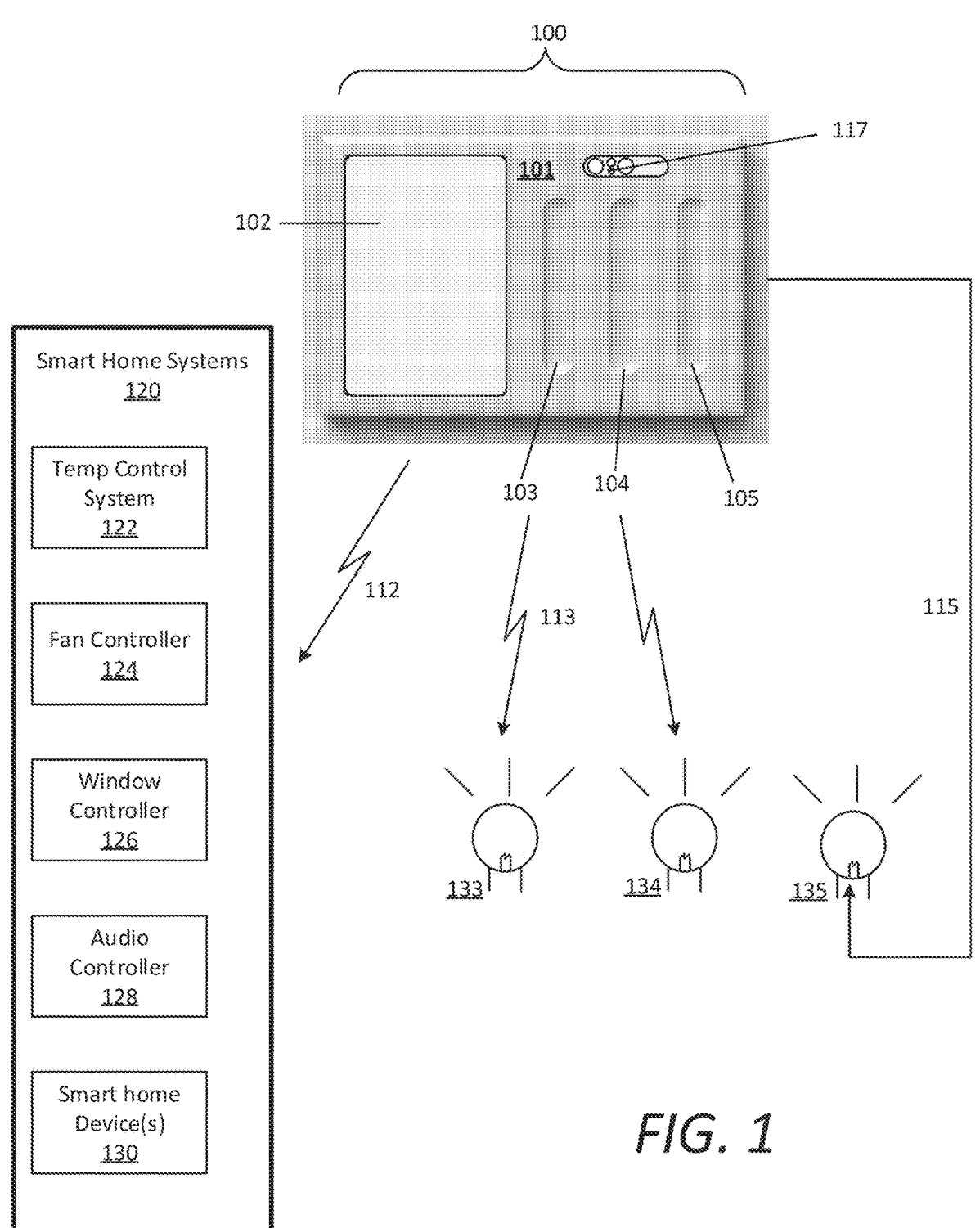
FIG. 1 illustrates an example of a home device controller including a touch control panel comprising multiple touch control grooves, according to various embodiments.

A distributed communication system of home device controllers for determining and executing automatic scenes for users is described herein. The distributed system can comprise a plurality of home device controllers, each being connected to a local network of home devices. For example, a home device controller can be wirelessly connected to one or more smart home devices or systems (e.g., a smart light, temperature control system, audio or entertainment system, etc.). In certain implementations, the home device controller can be wired to a home device (e.g., a light) using existing home wiring (e.g., light switch wiring) of a household. A user can interact with the home device controller via voice and/or touch gesture input to remotely operate the local network of home devices connected to the home device controller.

In various embodiments, the home device controller can include at least one touch control groove formed on a control panel of the home device controller. The touch control groove can comprise an elongated (e.g., vertically elongated) indentation within the control panel, and can be coupled to or otherwise influence a set of touch sensors (e.g., a capacitive slider sensor) provided underneath or behind the touch control groove. The user can perform one or more gestures on the touch control groove, which can be detect by a touch controller or microcontroller that generates a set of signals based on the gesture. The signals can be transmitted to processing resources (e.g., a microprocessor) of the home device controller, which can interpret the performed gesture(s) as control commands for a respective home device. For example, the touch control groove can be configured to control an adjustable parameter of a home device, such as a dim level of a light, volume of an audio system, temperature of a climate control system, and the like.

In certain implementations, the home device controller can include a touch screen, upon which the user can select from a set of home devices in the local network of the home device controller. In selecting a home device on the touch screen, the home device controller can remap the touch control groove to operate the selected home device. Accordingly, subsequent touch gestures performed on the touch control groove may be interpreted by the microprocessor of the home device controller as control commands specific to the selected home device. In certain aspects, the home device controller can be configured such that touch gestures performed on the touch screen can also be interpreted to control the selected home device. In certain aspects, the preselected home device can be controlled via touch gestures on the touch screen regardless of the current content being displayed on the touch screen (e.g., a preconfigured set of digital photographs).

A given home, business, or other space, can comprise any number of home device controllers each being operable to directly control a set of home devices within that home device controller's local network of home devices. Additionally, any home device within the space (e.g., a temperature control system) can be operated via any home device controller. For example, the user can control an audio system within the local network of a first home device controller through interaction with a second home device controller by selecting the audio system from a selectable menu of operable home devices on the touch screen of the second home device controller, and performing a set of touch gestures (e.g., tap gestures to select a radio channel or slide, swipe, tap-hold, and/or scroll gestures to make audio selections and/or change the volume). Upon receiving each set of gesture inputs, the second home device controller can transmit a data set corresponding to the touch gestures to the first home device controller, which can generate corresponding control commands for execution by the audio system.

According to embodiments described herein, the distributed home device controller system can capture historical data corresponding the user's interactions with home devices connected to the distributed home device controller system. Based on the historical data, the system can determine one or more patterns (e.g., behavioral or routine patterns) of the user. For example, the system can analyze the historical data based on a set of pattern thresholds that, when exceeded, trigger the system to, for example, generate a prompt (e.g., message, notification, alert, chime, user-interface feature etc.) on a user interface of a home device controller, where the prompt indicates a recognized behavioral scene pattern typically performed by the user with regards to interactions with home devices to set up or otherwise configure a scene (e.g., a combination of audio settings, temperature, lighting, digital picture settings, television channel selections, kitchen appliance activation, and the like).

When a particular behavioral or routine pattern threshold is crossed (e.g., based on a given confidence probability that the pattern will be repeated), the distributed home device controller system can generate a menu item on the user interface, which can suggest an automatic scene corresponding to the determined pattern. The suggested scene can be attributed to a set of situational constraints corresponding to the determined pattern, such as timing constraints (e.g., time of day, day of week, holiday, etc.) and/or contextual constraints (e.g., image recognition by one or more cameras for when the user goes to bed, leaves the house, enters the house, enters a particular room, wakes up in the morning, activates a particular home device, etc.). The user can select the menu item on the user interface to activate the scene or enable the system to activate the scene based on the timing and/or contextual constraints. Thereafter, the user may activate the scene by selecting a menu item corresponding to the scene on the user interface, or the scene may be automatically activated by the system, triggered by the timing and/or contextual constraints being satisfied.

In certain implementations, the system can provide a menu item on the user interface that enables the user to record a scene for storage and activation. For example, upon selection of the record menu item, the system can detect and record user interactions with home device controllers and/or the home devices themselves. Such interactions can correspond to a desired scene of the user, and can comprise temperature settings, lighting settings, audio settings, television or digital picture frame settings, home security system settings, and the like. In certain embodiments, the user can input timing constraints for the recorded scene (e.g., "activate scene at 7:30 am"), and/or contextual constraints (e.g., "activate scene when I get out of bed"). Upon creating the desired scene, the system can store the scene and generate a menu item corresponding to the recorded scene. In variations in which the user has inputted constraints, the system can automatically execute the scene based on the inputted constraints.

Still further, in come variations, the system can record a snapshot, where the snapshot reflects a current state of a home or dwelling. In such examples, the home may be represented by a pre-selected set of devices. The snapshot may record, for example, settings that reflect one or more of a power level, an operational setting and/or other configuration of individual devices in the pre-selected set. Additionally, in some examples, the settings may be specific to the type of device (e.g., whether device is on, off or dimmed).

According to some examples, the system can be configured to observe the user to identify co-occurrences in the user's actions within the system environment, and to further identify correlations with respect to timing and/or context in those actions. For example, the system can implement machine learning techniques to identify such patterns, which can be general to a group of users (e.g., a family within a home) or may be user specific (e.g., specific to the mother of a family within the household). In certain examples, the system can leverage imaging and/or audio resources to distinguish between users, through image and/or voice recognition (e.g., facial, height, body size, clothing, etc.). Such resources may be included as components of the home device controllers, such as cameras and microphones integrated on a control panel of the controller, or can comprise the home devices within the individual local device networks of the system (e.g., a smartphone). Over a given amount of time, the system can learn scene patterns created by users within the system environment (e.g., any combination of lights and dim levels, audio settings, fan settings, temperature settings, displayed photos or videos, television programs or on-demand content, door lock settings, kitchen appliance settings, and the like), and display an autosuggestion, such as an icon, corresponding to the identified scene pattern. In some aspects, the autosuggestion can also be user specific, and in certain examples, can name the user on the display screen (e.g., a menu item listing a suggested scene for "Peter"). In other variations, the autosuggestion can be specific to a location or time interval (e.g., time of day, day of week, etc.).

Upon selection of the autosuggested scene, the system can trigger the scene to be created on-the-spot, or can execute the scene based on the determined timing or context identified in the machine learning phase of scene pattern detection. For example, subsequent to selecting the autosuggested scene, the system can establish a set of triggers that cause the scene to be executed. The set of triggers can comprise a single trigger (e.g., at 7:00 am the scene is to be executed) or multiple triggers that may or may not depend on each other. As a further example, the system may detect when the user goes to bed at night, in which the trigger can comprise the user physically getting into bed. In response to this trigger, the system can automatically create a "sleep scene"—based on a previously detected pattern of the user's preferences when sleeping—which can comprise shutting down all audio, visual, and light systems, locking doors, setting a particular sleep temperature, shutting all curtains and blinds, and the like.

In some examples, a set of triggers can also comprise the user waking up in the morning (e.g., physically getting out of bed), or a combination of the user waking up and a timing constraint, such as a requirement that the time be later than 6:30 am for the scene to be executed, so as not to disturb others or falsely execute the full "wake-up scene" if the user is merely getting a glass of water, for example. In this example, the wake-up scene can comprise a combination of drawing curtains and blinds, initiating a coffeemaker, setting a particular temperature, activating lights (and dim levels), and the like. Numerous further examples for scenes and scene triggers are contemplated. In some aspects, the user activating a particular home device can comprise a trigger for a scene. For example, when the user turns on the television, the system can automatically set preferred lighting levels, power down other devices (e.g., audio devices), etc. based on previously learned patterns by the user. In still further examples, the user's location or entrance into a particular area of the system environment can comprise a scene trigger. For example, the user entering the living room can trigger the system to execute a learned scene for the user.

Additionally or alternatively, environmental conditions can trigger either the execution of a scene or adjusted parameters to scene components of an existing scene. For example, an outdoor temperature, weather conditions (e.g., sunny, cloudy, stormy, raining, snowing, dusk, dawn), and/or lighting conditions (e.g., the brightness of light entering the system environment through the windows) can comprise triggers and/or sub-triggers for execution of the scene, or adjustment of a scene (e.g., lowering or increasing the dim level of lights, adjusting the temperature, increasing or decreasing fan speed, etc.). Such environmental triggers or sub-triggers can be preprogrammed or otherwise predetermined by the system based on general preferences of a population of users, or can also be learned through a machine learning process.

In certain variations, when confidence of repeated patterns is sufficiently high, a learned scene may be automatically executed for the user without additional input (e.g., a menu item selection of an autosuggested scene). For example, user patterns in creating sleep and wake-up scenes can tend to be consistent and replicated daily such that the autosuggestion phase for these and other high-confidence scenes may be skipped. In still further aspects, the system can include voice recognition technology such that the user can merely speak to cancel or activate a particular scene, without having to make a selection on a displayed menu. For example, the system can learn distinct audio signatures for each named scene, such that when those audio signatures are detected, the system can automatically execute a corresponding scene.

Described herein are examples of "home device" controllers. However, such "home devices" are not limited to controllable or smart home devices within a household, but may be any remotely operable smart device in any setting (e.g., outdoors, in a business environment, etc.). Thus, the term "home" is termed in relation to any system environment where the distributed system of home device controllers is installed, and can include households, office spaces, other indoor spaces of businesses or other entities, outdoor spaces, and the like. For example, a smart device described herein as a home device can comprise a remotely operable sprinkler system, computing device, television or entertainment system, sprinkler system, kitchen devices (e.g., a stove, oven, refrigerator, coffeemaker, tea kettle, toaster, etc.), security system, garage door, gate, mailbox, doors, window shade actuators, fans, etc. A home device can also comprise a device wired to the home device controller (e.g., via standard light wiring) and traditionally operable by an analog light switch or dimmer switch. Such wired devices can include lights, fans, etc.

Among other benefits, the examples described herein achieve a technical effect of determining (e.g., via machine learning techniques) habitual user preferences or behaviors with regard to any number of home devices, providing scene suggestions, and/or automatically predicting and executing scenes for users based on one or more triggering conditions (e.g., a time of day and/or day of week trigger, a user detection trigger, a device activation trigger, an environmental trigger or sub-trigger, etc.). Techniques described herein comprise the use of home device controllers each operating a local network of home devices (e.g., smart home devices) for execution of scenes without user input based on determined and/or configured triggering conditions.

As used herein, a home device controller can comprise a computing device and can provide network connectivity and processing resources for communicating with a local network of home devices and a distributed system of home device controllers over one or more networks. The home device controller can also comprise custom hardware, and in certain examples, can also operate a designated application configured to communicate with the network of home device controllers.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Memory, processing, and network resources may all be used in connection with the establishment, use, or performance of any example described herein, including with the performance of any method or with the implementation of any system.

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on computing devices, such as the home device controllers described herein. Other examples of computer storage mediums include portable storage units, such as flash drives or flash memory (such as those included in smartphones, multifunctional devices or tablet computers). Computers, terminals, network-enabled devices (e.g., mobile devices or home device controllers described herein) are all examples of machines and devices that utilize processors, memory, and instructions that may be stored on computer-readable mediums. Additionally, examples may be implemented in the form of computer-programs, or a computer usable carrier medium capable of carrying such a program.

Home Device Controller

FIG. 1 illustrates an example of a home device controller including a touch control panel comprising multiple touch control grooves, according to various embodiments. The example shown in FIG. 1 is a frontal view of the home device controller 100 that includes touch control panel 101. According to one or more examples, the home device controller 100 may provide the capability for a user to control lighting levels of one or more connected lights 133, 134, 135. The touch control panel 101 can comprise a mounting plate for a wall, and may be a component of the home device controller 100, which can include AC electronics and may be mounted in a wall (e.g., of a building such as a home or business). In some embodiments, the touch control panel 101 may include a removable bezel, e.g. a plastic bezel, that may be snapped on and off of the unit, thereby providing a capability for cosmetic changes, e.g. color changes, without necessitating replacement of the entire touch control panel 101.

In the example shown in FIG. 1, the home device controller 100 can be mounted to replace an existing light switch panel, and can further utilize the existing load and line wires of the gang-box mounted within the wall behind the light switch panel. The home device controller 100 can include processing and memory resources as well as network communication modules implementing one or more network communications protocols. In certain aspects, one or more of the touch control grooves (e.g., control groove 105) can be associated with a wired connection 115 to a home device, such as a light element 135 (e.g., via a direct wiring from a load wire attached to the home device controller). For such wired connections, the home device need not be a smart home device (e.g., including a controller and/or wireless communication module).

In various examples, the home device controller 100 can include lighting control capability that may be integrated into the same module. For example, a home device controller 100 can function as an AC dimmer, which commonly dims a light by chopping up or otherwise manipulating the output AC waveform on the load wire going to a light by eliminating some portion of the output, relative to the input line AC (e.g., of the line wire), during a phase of the duty cycle (e.g., a leading edge or trailing edge dimmer which may chop out a part of the waveform either before or after zero crossings), resulting in a duty cycle that indicates the desired amount of dimming. In various embodiments, the home device controller 100 can perform such dimming using a triac or a field-effect transistor (FET), such as a MOSFET (e.g., a pair of FETs and/or MOSFETs), which may be under the control of a microcontroller or touch controller (e.g., an Atmel ATTiny or ATMega) that receives instructions on a desired on/off/dimming level state and adjusts its outputs accordingly.

In some embodiments, the home device controller 100 may utilize DC power for lighting (e.g., 10V, 12V, or 24V) in which the output voltage may be varied. In some embodiments, the home device controller can utilize a Digital Addressable Lighting Interface (DALI) for controlling a light. In some embodiments, the home device controller can transmit lighting control commands, corresponding to a specified on/off/dimming state, based on touch gestures on the control groove 103, 104, 105 using a wireless network such as WiFi, Zigbee, Z-Wave, or Bluetooth (including BLE).

The control panel 101 can include one or more touch control grooves 103, 104, 105, each of which can be formed on the touch control panel 101 of the home device controller 100 and may provide the capability to adjust lighting or control functions other home devices. A touch sensor, such as a capacitive touch sensor or a combination of a plurality of capacitive touch sensors, may be placed underneath or otherwise coupled to each control groove 103, 104, 105. For example, the touch sensor may be embedded in a printed circuit board (e.g., made of glass-reinforced epoxy laminate sheets, such as FR4) or in polyimide film such as Kapton, which in some embodiments may be integrated with a flex connector.

In various implementations, the control panel 101 can further include a touch screen 102. In an illustrative embodiment, software may provide a user interface on the screen 102, or via a mobile application on a smartphone or a website provided by a server, which provides the user with an option to map a particular touch control groove to a particular output, such as a physical lighting circuit connected to the home device controller 100, a physical lighting circuit connected to a different home device controller, or a third party device such as a smart bulb, an audio system, smart blinds or curtains, a thermostat, or a fan. When a home device is selected to be mapped to a touch control groove 104, the home device controller 100 may be notified and may store a mapping in its memory (e.g., in non-volatile memory such as flash memory) that associates the home device with an identifier associated with the touch control groove 104. Subsequently, when a gesture is detected in the touch control groove 104, the mapping may be consulted, or a state resulting from an earlier consultation of the mapping may be in place, and consequently the home device may be controlled accordingly by the gesture in the touch control groove 104.

Connected to otherwise coupled to each touch control groove 103, 104, 105 may be a corresponding touch sensor or set of touch sensors (e.g., a capacitive touch slider). The touch sensor may be configured to perform in a slider configuration, and/or may be implemented utilizing any combination of capacitive touch sensors, such as CapTIvate™ capacitive touch sensor technology developed by Texas Instruments. In certain embodiments, the touch slider can comprise such as a planar or non-planar, self-capacitance or mutual capacitance, interdigitated X and Y electrodes, or flooded-X capacitive slider, and may be implemented behind the control grooves 103, 104, 105. The touch sensor can be connected to a touch controller, such as a microcontroller. The touch controller can analyze the capacitance of the touch sensor and generate digital or analog signals. Signals from the touch controller may be transmitted to a microprocessor, for example, using a Universal Asynchronous Receiver/Transmitter (UART), Inter-Integrated Circuit (I²C), or Serial Peripheral Interface bus (SPI).

Each touch slider may be associated with a particular light circuit (e.g., the home device controller 100 may have multiple outputs, each of which can be assigned to a particular touch slider and therefore a particular corresponding touch control groove). Therefore, when the touch controller detects a gesture at a particular touch slider corresponding to a particular touch control groove, the touch controller can transmit a set of signals corresponding to the touch gesture to a microprocessor of the home device controller 100, which can generate a corresponding control command for the circuit corresponding to the touch slider and control groove combination. In some embodiments, such circuits may be physical circuits (e.g., AC or DC circuits as described above). In some embodiments, such circuits may be virtual circuits, wired or unwired, and the microprocessor can transmit the control instructions corresponding to the detected gesture, as described above using the applicable network (e.g., WiFi, Zigbee, Z-Wave, DALI, Bluetooth, etc.).

Touch gestures may be performed by a user in any of the touch control grooves 103, 104, 105 and interpreted by the microprocessor of the home device controller 100 to generate the control commands for any of the lights 133, 134, 135 or smart home systems 120 connected to the home device controller 100. In particular, the microprocessor can detect one-dimensional touch gestures such as taps, flicks, and slides. For example, the microprocessor can detect touch gestures by analyzing the signals corresponding to gestures performed on the touch control grooves 103, 104, 105. The signals can be received by the microprocessor over a specific interface (e.g., UART, I²C, SPI, etc.) used for communication between the touch controller(s) and the microprocessor. At the microprocessor, the signals may be interpreted to determine positions and times at which a finger is detected (or ceases to be detected), and from which the microprocessor can calculate touch velocities, accelerations, touch pressure, and touch position on the respective control groove 103, 104, 105. The microprocessor can combine the touch positions, times, velocities, etc. to derive gestures can generate corresponding control commands for connected lighting devices 133, 134, 135 or other home device systems 120. In some embodiments, machine learning techniques may be applied to create gesture recognizer models using training data of touch gestures and corresponding classifications (e.g., from a plurality of people).

In various examples, the microcontroller or touch controller can assign numerical values to the dimming level of lights in a predetermined range 0 . . . n, where 0 represents "off" and n represents a maximum value. On/off lights such as lights that are not dimmable or are otherwise configured not to be dimmed may have n=1 in some embodiments, or may use the same maximum value as an unrestricted dimmable light in some embodiments. The microcontroller can transmit the assigned numerical value to a module (e.g., a microprocessor of the home device controller 100 or a processing resource of a smart bulb) that sets the output level of the light.

In some embodiments, lights may be calibrated to have a minimum and/or maximum dim value. The maximum dim value can correspond to a maximum brightness to which the light may be interactively dimmed. The minimum dim value can correspond to a minimum brightness "on" value to which the light can be dimmed (e.g., any increase in the dim level from a 0 "off" value may incur immediately setting the dim level to the minimum dim level, which may be adjusted upward therefrom, and any decrease in the dim level from the minimum level may incur immediately setting the dim level to a 0 "off" value).

According to various examples, the screen 102 can comprise a touch screen and can enable the user to operate any number of connected smart home systems 120, such as smart light devices 133, 134, a temperature control system 122, a fan controller 124, a window controller 126, an audio controller 128, or any other smart home device 130 (e.g., a smart kitchen appliance, sprinkler system, security system, etc.). In certain implementations, the user can select a particular smart home device on the touch screen 102 and can utilize a touch control groove 103, 104 to turn on/off or adjust a particular adjustable parameter of the selected smart home device.

In variations, the screen 102 itself can behave as a touch control groove, and the user can input gestures thereon to control a selected smart home device in accordance with the description provided herein (e.g., using the Y-axis reported by the touch screen as the position within a touch control groove for touch gesture recognition as described herein). In such embodiments, gesture recognition may be performed in the presence of other user interface elements being displayed on the screen, such as picture display, motion art display, selectable items such as scenes or devices, etc. In such embodiments, when a touch on the screen is detected, the microprocessor may determine whether the touch comprises a touch control gesture, as discussed herein. If so, then the microprocess can cause the functionality for that gesture to be executed by the selected home device. If not, then the touch information may be relayed to other processing components for interpretation, such as interactions with an on-screen user interface.

In one example, if the user selects the temperature control system 122 on a displayed selectable menu on the touch screen 102, the microprocessor can be triggered to interpret gestures performed on the touch screen 102 as control commands for adjusting the room temperature. Thus, a touch-scroll gesture upwards on the touch screen 102 can cause the microprocessor to generate commands to increase the temperature of the room, and transmit those temperature control commands to the temperature control system 122.

In certain implementations, a touch control groove (e.g., control groove 103) can act as a dedicated control groove for a particular smart home device (e.g., light element 133). In such implementations, the user can perform gestures on the control groove 103, and the microprocessor of the home device controller 100 therein can interpret the gesture, generate control commands for the light element 133 in accordance with the gesture, and transmit the control commands to the light element 133 over a wireless connection 113 using a specified communication protocol (e.g., Zigbee).

In variations, a touch control groove (e.g., control groove 104) can comprise a universal control groove 104 that can dynamically change connectivity between the various smart home systems 120 and/or light elements 133, 134 based on user selections from a displayed selectable menu on the screen. Furthermore, based on a user selection of a particular smart home device, the microprocessor therein can adaptively alter or remap gesture interpretations for gestures performed on the control groove 104. For example, if the user selects the window controller 126 on the touch screen, the microprocessor can be triggered to interpret gestures performed on the control groove 104 as control commands for an actuator or servo operable to open or close window shades or blinds, and transmit the control commands to the window controller 126 over a wireless connection 112.

In further implementations, the touch screen 102 can graphically display dynamic content corresponding to the gestures being performed by the user on the touch screen 102 or a particular control groove 103, 104, 105, such as displaying a dynamic temperature setting, dim value, fan speed, window-shade setting, or volume. The utilization of three touch control grooves 103, 104, 105 shown in FIG. 2 is purely illustrative, and it is contemplated that the same techniques described herein may be implemented for one, two, four, five, six or more touch control grooves (and corresponding touch sliders).

In certain implementations, the home device controller 100 can further include additional input and/or sensor resources 117, such as a camera and microphone. In some aspects, the home device controller 100 can execute image recognition (e.g., facial, height, body type, etc.) and/or voice or sound recognition to distinguish between users. Additionally or alternatively, the home device controller 100 can receive voice commands via a microphone of the input resources 117 that can cause the home device controller 100 to generate a corresponding set of control commands for one or more home devices. For example, the user can speak a command such as "dim level six," which can be detected by the microphone, and which the home device controller 100 can interpret to generate a set of control commands for one or more of the lights 133, 134, 135 to set the dim level accordingly.

Distributed Home Device System

Figure 2:
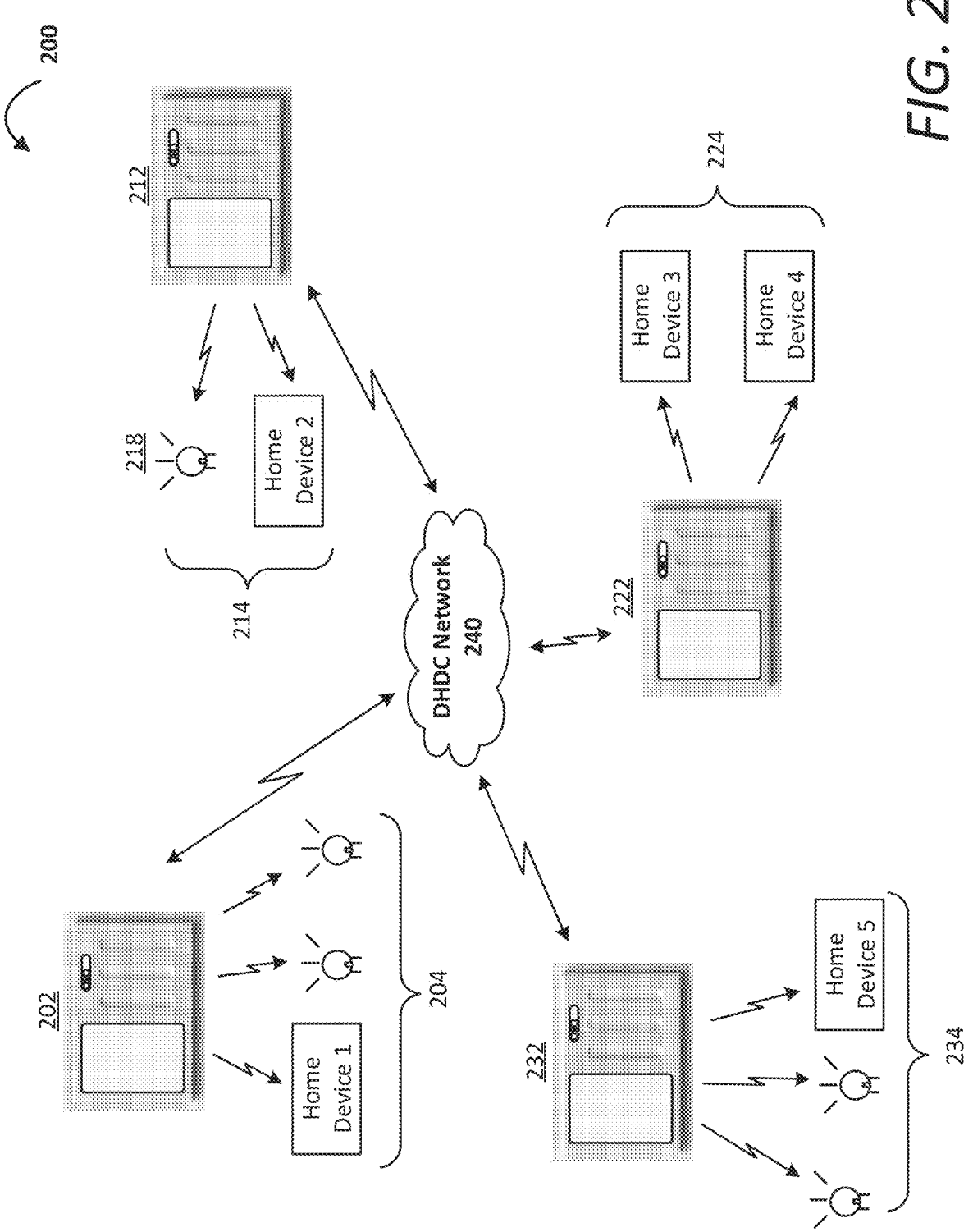
FIG. 2 illustrates an example of a distributed system of home device controllers operable to control any number of home devices, according to various embodiments.

FIG. 2 illustrates an example of a distributed system of home device controllers operable to control any number of home devices, according to various embodiments. Each home device controller 202, 212, 222, 232, shown in FIG. 2 can comprise an example of a home device controller 100, 150 as shown and described with respect to FIGS. 1A and 1B. Referring to FIG. 2, the distributed system 200 can include any number of home device controllers 202, 212,

222, 232 each having a local network of any number of home devices 204, 214, 224, 234. A user may interact with any individual home device controller (e.g., home device controller 202) to operate any home device within the local network 204 of that home device controller 202, and any home device in the local networks 214, 224, 234 of the remaining home device controller 212, 222, 232 in the distributed system 200 via a distributed home device controller network 240 (DHDC Network 240) that connects each of the home device controllers 202, 212, 222, 232 with each other. It is to be noted that the light elements shown in FIG. 2 can also be described as home devices, but are not labeled as such for simplicity.

In the example shown in FIG. 2, home device controller 202 can comprise a leaseholder of a local network of home devices 204 comprising two light elements and home device 1. Home device controller 212 is the leaseholder of a local network 214 comprising one light element 218 and home device 2. Home device controller 224 is the leaseholder of a local network 224 comprising home device 3 and home device 4. And, home device 232 is the leaseholder of a local network 234 comprising two light elements can home device 5.

As a distributed system 200, when a new home device is installed or otherwise enters the influence of the distributed system 200, the home device controllers 202 can enter into a lease acquisition arbitration process that determines which home device controller 202, 212, 222, 232 ultimately acquires the lease, as leaseholder, to include the new home device within its local network. It is contemplated that the lease acquisition rules for the arbitration process are minimally contentious or non-contentious based on objective current capabilities of each home device controller 202, 212, 222, 232 to control the new device. As such, the control requirements and location of the device may be revealed to the DHDC network 240 (e.g., during a discovery phase), and such factors as proximity, bandwidth requirements, current load on each individual home device controller, required communication protocol(s), and the like may be determinative regarding which home device controller ultimately becomes the leaseholder of the new home device. In variations, a new home device may be configured by a user to be established within the local control network of a specified home device controller in the system 200.

In various implementations, any state changes to any adjustable parameter of the home devices under control of the distributed system 200 (e.g., dim level changes, volume changes, temperature adjustments, etc.) can be processed and published to a message bus of the DHDC network 240. The message bus can enable each home device controller 202, 212, 222, 232 to publish the state changes as named values (e.g., dim level values) appended to a device identifier of the home device, and a time stamp corresponding to a time in which the state change took place. In certain examples, the home device controllers 202, 212, 222, 232 may be required to periodically publish the current state of each home device within its respective local network 204, 214, 224, 234 to the message bus, which can transmit the state change data to a distributed data store via the DHDC network 240. As provided herein, the distributed data store can be included in local memory of the home controller devices 202, 212, 222, 232 of the distributed system 200, one or more communication hubs leveraged by one or more of the home device controllers, and/or a local or remote computing device or server accessible via the DHDC Network 240.

According to various examples of FIG. 2, as the leaseholder to light element 218 and home device 2, home device controller 212 can receive relayed control commands from any other home device controller 202, 222, 232 in the distributed system 200 via the DHDC Network 240 to operate light element 218 and home device 2. Likewise, a user can operate home device controller 212 to transmit control commands to any home device (and light element) in any local network 204, 224, 234 of the other home device controllers 202, 222, 232 via the DHDC Network 240.

According to examples provided herein, as a distributed home device controller system 200 communicating via the DHDC Network 240, the system 200 can collect historical data corresponding to the user's interactions with any of the home devices within the local networks 204, 214, 224, 234 of the home device controllers 202, 212, 222, 232. The system 200 can analyze the historical data for scene patterns configured by the user or users of the system 200. In doing so, the system 200 can determine time correlations and/or contextual correlations with the user's interactions with the home devices to identify any scene patterns. In some aspects, a scene pattern may be identified based on a set of repeated factors. For example, if a configured scene is repeated a certain number of times (e.g., ten times) or at a certain rate (e.g., averaging once per day), the system can generate an automatic scene for the repeatedly configured scene. In some aspects, the system 200 can provide the user a selectable menu item on the display screen 102 of any of the home controller devices 202, 212, 222, 232 comprising the automatic scene.

In various examples, the system 200 can provide a recording function on any of the home device controllers 202, 212, 222, 232 that enables the user to record a scene. In some examples, a user selection of the recording function can cause the system 200 to record inputs by the user interacting with various home devices in configuring the scene. The user may, for example, set a temperature, a fan speed, a lighting level, a digital photo arrangement (e.g., on a television or digital picture frame system), an audio player, and the like. Upon completion of configuring the scene, the user may reselect the recording function to cause the system 200 to store the configured scene as an automatic scene, which can subsequently be displayed as a selectable menu item. In variations, the recording function can record a snapshot, reflecting a setting for the various devices of the example (e.g., temperature, fan speed, lighting level, digital photo arrangement, audio player, etc.).

In certain variations, upon completing or prior to initiating a recorded scene, the user can input any number of triggers that cause the automatic scene to be executed by the system 200. For example, the user can input a time trigger that the scene be executed on weekdays at a particular time. Additionally or alternatively, the user can input a presence trigger that causes the scene to be executed when the user enters the room, or a device activation trigger that causes the scene to be executed when the user activates a device, such as a light switch or television. The inputted triggers may involve additional contextual information, such as an outdoor lighting conditions, indoor lighting conditions, outdoor temperature and/or weather, and/or can comprise triggers that are associated with a predetermined theme. Such thematic triggers can correspond to, for example, a dinnertime theme, a sports or movie watching theme, a date night theme, a morning routine theme, or a bedtime theme. In certain variations, the system 200 can sync with mobile device resources of, for example, a smartphone of the user to establish additional triggers, such a calendar triggers based on events in the user's calendar (e.g., a birthday or a travel event). Accordingly, as described herein, the system 200 may monitor the user in light of the triggers, and when the triggers occur, the system 200 may execute the automatic scene.

It is contemplated that the system 200 can execute scenes in a user specific manner, or generally for all users. For example, a child within a household can be associated with a customized set of scenes, a father of the household can be associated with a different set of scenes, and a mother of the household can be associated with yet another set of scenes, all of which can be stored in the distributed data store of the system 200 with corresponding activation triggers. In variations, the system 200 can store a combination of user specific scenes as well as general scenes. In user specific implementations, the system 200 can detect users based on voice and/or image recognition, as described herein.

According to examples provided herein, the system 200 can execute machine learning techniques to determine user behaviors, routines, and interactional patterns with the home devices. For example, the system 200 can monitor and analyze user activity with respect to the home devices over a given time period or continuously, and correlate the interactions of the user with the home devices with timing information (e.g., day of the week, time of day, day of the year, calendar data, etc.) and/or contextual information (e.g., the user's presence, the user getting out of or into bed, etc.).

In various aspects, the system 200 can analyze historical data, record scenes, or execute machine learning using the processing resources of the home device controllers, any connected communication hubs, or a remote backend server accessible over one or more networks (e.g., the DHDC Network 240 can enable access to remote computing resources, such as a data center).

In certain implementations, the execution of machine learning techniques can cause the system 200 to generate an autosuggestion for a scene based on, for example, a pattern confidence threshold being exceeded, such as a greater than 95% probability that a scene pattern will be repeated at a given time and/or given a set of contextual triggers. In variations, if the confidence probability is sufficiently high (e.g., greater than 99%) the system 200 can automatically execute the scene when the set of triggers are detected, as opposed to requiring that the user select an autosuggestion. According to various embodiments, when the scene pattern is determined based on the confidence threshold being met or exceeded, the system 200 can display a selectable menu item corresponding to the suggested automatic scene on the display screen 102.

Whether based on historical data, recorded data, or via machine learning, the menu item corresponding to the automatic scene may be selected by the user, which can trigger the scene to be immediately executed, or authorized for execution when the trigging conditions for the scene are met. Thereafter, the system 200 can monitor the system environment for the triggering conditions. When triggers are detected, the system 200 can execute the automatic scene accordingly.

Automatic Scene Execution

FIG. 3 illustrates execution of an automatic scene by one or more home device controllers, according to various aspects described herein. A number of home device controllers 302, 322 of a DHDC Network 240 as shown and described in FIG. 2, can monitor the system environment 300 for triggering conditions that cause an automatic scene to be executed. As described herein, the home controllers 302, 322 can each control a local network of home devices, such as lighting elements 312, a fan 314, a television 304, and audio system 306, a temperature control system 308, a door locking system 324, and lighting elements 332, and any number of other home devices mentioned throughout the present disclosure.

In the example shown, the user 310 can enter a particular room or perform a particular action that comprises a scene trigger, which can be detected by home device controller 302 and communicated to the DHDC Network 240—including home device controller 322—to execute a corresponding automatic scene. Additionally or alternatively, the scene trigger can comprise a time trigger constraint that can ultimately determine whether the scene gets executed (e.g., a timing rule that the scene only be executed if the contextual triggers are detected and the time is after 7:00 pm). Such conjunctive triggers must all be satisfied in order for the scene to be executed, and may be determined automatically by the system 200 or configured by the user 310. In alternative examples, the triggers may be disjunctive, and cause the automatic scene to execute if any one or more of the triggers (timing or contextual) are detected by any home device controller, or a specific home device controller 302.

When the triggering conditions are met and the home device controller 302 has communicated a message to trigger the automatic scene to the DHDC Network 240, relevant home device controllers 302, 322 can execute the automatic scene by generating and transmitting control commands to the various home devices needed to execute the automatic scene. For example, the automatic scene can comprise a combination of dim levels for lighting elements 312 and 332, displayed content on the television 304, a music channel or file content to be played on the audio device, a certain temperature setting on the temperature control system, activation of the fan 314 at a certain setting, and/or the door locking mechanism 324 to be activated or deactivated. Based on the various settings of the automatic scene, the home device controllers 302, 322 can generate control commands, and transmit them to the relevant home devices to execute the automatic scene.

Methodology

FIGS. 4 and 5 are flow charts describing example methods of determining and executing automatic scenes via home device control, according to various implementations. In the below description of FIGS. 4 and 5, reference may be made to reference characters representing like features as shown and described with respect to FIGS. 1-3. Furthermore, the processes described in connection with FIGS. 3 and 4 may be performed by controllers or processing resources of one or more home device controllers 100 as shown and described with respect to FIGS. 1-3.

Referring to FIG. 4, a distributed system of home device controllers 200 can control a set of home device within one or more local networks of one or more home device controllers (400). Control of the home devices can be based on user gesture inputs performed on the home device controller(s) (402), or based on execution of configured scenes by the user (404). The system 200 can analyze interactions of the user with the home devices (405). For example, the system 200 can analyze stored historical data of the user's interactions with home devices (407), or be triggered to analyze the interactions based on a recording trigger (e.g., the user selecting a scene recording feature on a display 102 of a home device controller 100) (409). In some examples, the system 200 can analyze the interactions to determine specific triggers for individual scenes. In variations, the system 200 can analyze the interactions to determine a set of directives that are to form the scene as a response (e.g., turn off the lights, arm the security system and/or turn off the heater.). Based on the interactions, the system 200 can determine a scene pattern, such as a repeating scene pattern in historical data or a recorded scene pattern, configured by the user (410). The system 200 may then generate an automatic scene corresponding to the scene pattern to enable subsequent execution of the automatic scene without user interaction with the home devices (e.g., either directly or indirectly via a home device controller) (415). For example, the automatic scene can be executed when a set of triggers are detected (417), or when the user selects a single automatic scene menu item displayed on a home device controller (419).

FIG. 5 is a flow describing a method of determining and executing automatic scenes based on machine learning techniques described throughout the present disclosure. Referring to FIG. 5, the distributed system of home device controllers 200 can control a set of home devices within the local network(s) of the home device controller(s) (500). As described herein, control of the home devices may be performed based on user inputs (e.g., gesture input, voice input, menu selection, etc.) on the home device controllers (502), or based on scenes configured by the user or automatically determined (504).

In various aspects, the system 200 can execute machine learning to identify scene patterns performed by the user (505). Such patterns may be based on the user's interactions with home devices and/or home device controllers in the system 200 (507). In certain examples, the patterns may further be correlated with time and/or contextual information (509). The system 200 can determine scene patterns by determining whether confidence threshold has been crossed with respect to a particular repeated scene (510). If not (512), the system 200 can continue to attempt to identify scene patterns via execution of the machine learning techniques (505). However, is a confidence threshold is met or exceeded (514), the system 200 can generate an automatic scene corresponding to the identified scene pattern (515). According to examples described herein, the system 200 can associate the automatic scene with timing triggers (519) and/or contextual triggers (519), as described herein.

In some aspects, the system 200 can display a menu item on a home device controller 100 comprising an autosuggestion of the scene (520). The system 200 can receive a selection of the menu item (525). In response to the selection, the system 200 can execute the automatic scene without a trigger (530). In a variation, the system can respond to the user selection by enabling automatic scene execution, such as by monitoring the system environment 300 for the scene triggers (535). In the latter case, the system 200 can determine whether the triggers corresponding to the scene have be detected (540). If not (542), then the system can continue monitoring the system environment 300 (535). However, if the triggers are detected (544), the system 200 can execute the automatic scene according to the examples described herein (545). In doing so, the system 200 can generate and transmit control commands to the respective home devices needed to create the scene (550).

Hardware Diagram

Figure 6:
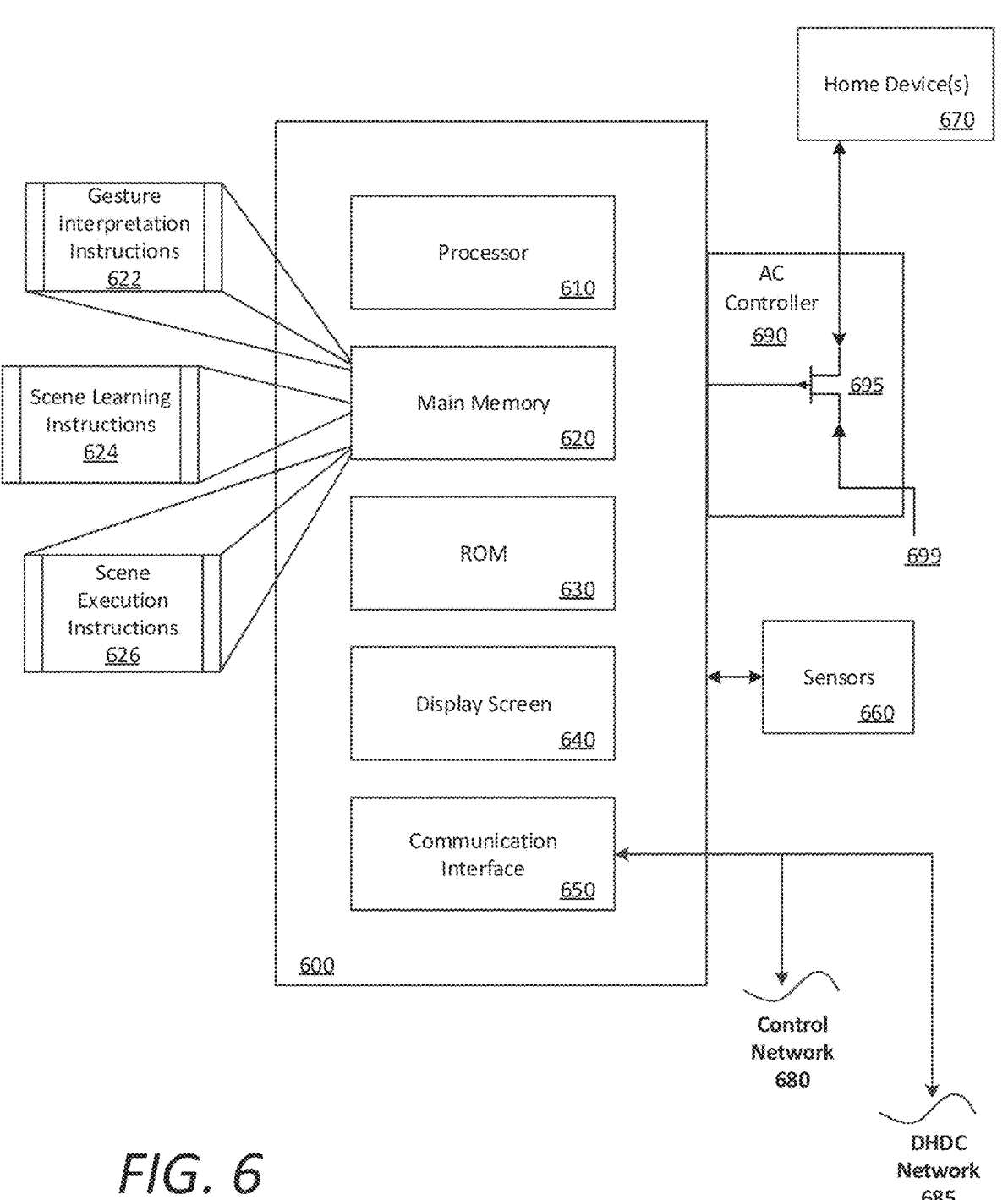
FIG. 6 is a hardware diagram illustrating a computing device upon which example home device controllers described herein may be implemented.

FIG. 6 is a hardware diagram illustrating a computing device upon which example home device controllers described herein may be implemented. In various examples, the computing device 600 can comprise the logic and processing performed via user interaction with the home device controllers 100 as shown and described with respect to FIGS. 1-3. In one implementation, the computing device 600, or home controller 600 (used interchangeably) includes processing resources 610, a main memory 620, a read-only memory (ROM) 630, a display 640, and a communication interface 650. The computing device 600 includes at least one processor 610 for processing information stored in the main memory 620, such as provided by a random-access memory (RAM) or other dynamic storage device, for storing information and instructions which are executable by the processor 610. As provided herein, the "microcontroller" or "microprocessor" described throughout can comprise the processor 610 or combination of the processor 610 and main memory 620 as shown and described with respect to FIG. 6. In various embodiments, the microprocessor may be a general-purpose microprocessor, a microcontroller, a combination of one or more microprocessors and/or microcontrollers acting in concert, and/or a touch sensor specific integrated circuit incorporating, or connected to, one or more of these processing configurations. The main memory 620 also may be used for storing temporary variables or other intermediate information during execution of instructions to be executed by the processor 610. The computing device 600 may also include the ROM 630 or other static storage device for storing static information and instructions for the processor 610.

The communication interface 650 enables the computing device 600 to communicate over one or more control networks 680 (e.g., Bluetooth, Zigbee, Wi-Fi, etc.) through use of one or more wireless network links. Using the network links, the computing device 600 can communicate with one or more home devices, one or more servers or third-party intermediary communication module. The executable instructions in the memory 620 can include gesture interpretation instructions 622, which the computing device 600 can execute to determine gestures performed by users on a particular control groove or on the display screen 640, and generate control commands for the appropriate home device accordingly. For example, the processor 610 can execute the gesture interpretation instructions 622 to receive signals from the sensors 660 coupled to the control groove(s) and/or touch sensors of the display, and generate control commands based on the detected gestures. As described herein, the sensors can further include one or more cameras and/or microphones for image or voice recognition.

The executable instructions stored in memory 620 can also include control connectivity instructions (not shown), which the computing device 600 can execute to selectively connect the communication interface 650 to various home devices to transmit the generated control commands by the processor 610 executing the gesture interpretation instructions 622. As described herein the computing device 600 may be connected via a wired connection to one or more home devices 670 (e.g., light elements), or can implement wireless network protocols to connect with smart home devices via the control network 680 to transmit the control commands and/or the DHDC Network 685 to communicate with other home device controllers or a backend datacenter and/or publish state updates and changes via a message bus.

The executable instructions stored in memory 620 may also include scene learning instructions 624, which the processor 610 can execute to analyze a system environment for user interactions with home devices that indicate a particular scene pattern in light of timing and/or contextual triggers. For example, execution of the scene learning instructions 624 can cause the computing system 600 to analyze the user interactions based on a confidence probability threshold that, when exceeded, can cause the computing system 600 to generate an automatic scene suggestion or selectable menu item on the display screen 640. The instructions stored in memory 620 can further include scene execution instructions 626 that cause the computing system 600 to monitor the system environment for scene triggers that, when detected, cause the computing system 600 to execute the corresponding scene.

In some embodiments, the home controller 600 may be coupled to AC controller 690, for example by clips that provide for an electrical connection to be made between spring clips or pogo pins on one side (e.g., the home controller 600 or the AC controller 690) and electrically conductive pads on the corresponding side. AC controller 690 may include connections to wall wiring for line, load, neutral, and/or ground wires, and in some embodiments, may include L1 and L2 outputs for 3-way configurations. In some embodiments, AC controller 690 may include an AC microcontroller which receives instructions from home controller 600, and which may control field effect transistors, triac(s), and/or other dimming mechanisms, for example as discussed above. In certain examples, the AC controller 690 can include a dimming FET 695 connecting the AC controller 690 to a line wire and load wire of existing wiring (e.g., of a light switch). In the example shown in FIG. 6, the load wire connects the AC controller 690 to the one or more wired home devices 670 (e.g., lights), and the line wire connects the AC controller 690 (a home device controller 600) to a power source 699.

The processor 610 is configured with software and/or other logic to perform one or more processes, steps and other functions described with implementations, such as described with respect to FIGS. 1 through 5 elsewhere in the present application. Examples described herein are related to the use of the computing device 600 for implementing the techniques described herein. According to one example, those techniques are performed by the computing device 600 in response to the processor 610 executing one or more sequences of one or more instructions contained in the main memory 620. Such instructions may be read into the main memory 620 from another machine-readable medium. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A system for controlling home devices in an environment, the system comprising:
at least a first home device controller comprising:
a wireless communication interface;
a display screen;
one or more processors; and
a memory storing instructions that, when executed by the one or more processors, cause the first home device controller to:
determine, at multiple times, a set of configurations for that have been applied to a set of home devices of the environment to implement one or more scenes, the set of configurations being repeatedly configured by a one or more users interacting with the first home device controller;
determine at least one of a timing or a contextual correlation with respect to the set of configurations that are applied to the set of home devices;
based on the at least one of the timing or the contextual correlation, determine a set of triggers for implementing one or more scenes;
automatically display, on the display screen, a selectable feature indicating a suggested scene of the one or more scenes;
receive one or more inputs to select the suggested scene;
based at least in part on the one or more inputs, associate the suggested scene with the set of triggers; and
in response to detecting a trigger in the set of triggers, automatically transmit a set of commands that correspond to the suggested scene to the set of home devices, the set of commands causing the set of home devices to applying a corresponding configuration for implementing the suggested scene.

2. The system of claim 1, wherein the set of triggers are determined using machine learning.

3. The system of claim 1, wherein the set of triggers are based on one or more timing constraints.

4. The network system of claim 3, the one or more timing constraints indicate at least one a time of day, a day of week, or a holiday.

5. The system of claim 1, wherein the set of triggers are based on one or more contextual constraints.

6. The system of claim 1, the one or more contextual constraints corresponds to a user entering or leaving the environment.

7. The system of claim 1, the one or more contextual constraints corresponds to a user performing an action within the environment.

8. The system of claim 1, the one or more contextual constraints are detected by the one or more processors performing image recognition on images captured by a camera of the first home device controller.

9. The system of claim 1, wherein the set of home devices comprise at least one of a lighting system, a digital photo display system, a television, an audio system, a temperature control system, a fan controller, a window control system, a security system, or one or more kitchen appliances.

10. The system of claim 1, wherein the suggested scene is determined by applying machine learning to historical information about the one or more users interacting with the first home device controller at the one or more times.

* * * * *